Figure 1:
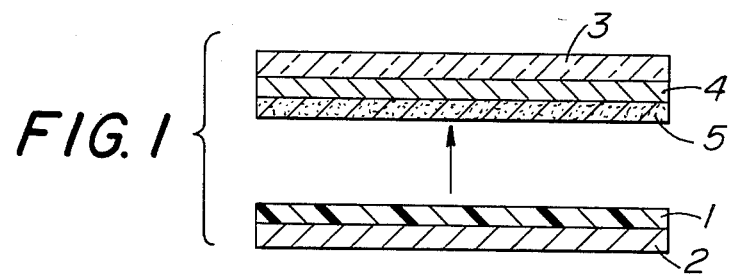

United States Patent [19]

Kardon

[11] Patent Number: 4,560,902
[45] Date of Patent: Dec. 24, 1985

[54] ADHESIVELY BONDED ELECTROLUMINESCENT SYSTEM

[76] Inventor: Donald R. Kardon, 134 N. Narberth Ave., Narberth, Pa. 19072

[21] Appl. No.: 514,517

[22] Filed: Jul. 18, 1983

[51] Int. Cl.⁴ .............................................. H05B 33/02
[52] U.S. Cl. .................................... 313/502; 313/509; 156/330
[58] Field of Search ............... 313/498, 502, 506, 509; 525/502; 528/86, 102, 105, 106, 107; 156/330; 428/414

[56] References Cited

U.S. PATENT DOCUMENTS

| | | | |
|---|---|---|---|
| 2,918,594 | 12/1959 | Fridrich | 313/506 |
| 3,148,299 | 9/1964 | Devol et al. | 313/108 |
| 3,172,773 | 3/1965 | Blazek | 117/33.5 |
| 3,267,318 | 8/1966 | Lynch et al. | 313/509 |
| 3,315,111 | 4/1967 | Jaffee et al. | 313/108 |
| 3,421,037 | 1/1969 | Dymon | 313/509 X |
| 3,573,532 | 4/1971 | Boucher | 313/509 |
| 3,783,022 | 1/1974 | Ueda | 117/215 |
| 4,097,776 | 6/1978 | Allinikov | 313/502 |
| 4,383,090 | 5/1983 | Slocki et al. | 525/502 |
| 4,396,864 | 8/1983 | Suntola | 313/506 |

FOREIGN PATENT DOCUMENTS 1129816 10/1968 United Kingdom .

Primary Examiner—David K. Moore
Assistant Examiner—K. Wieder
Attorney, Agent, or Firm—Joseph W. Molasky

[57] ABSTRACT

There is described an electroluminescent system in which the components are bonded to one another via an epoxy-based adhesive derived from an epihalohydrin and a bisphenol.

4 Claims, 3 Drawing Figures

ADHESIVELY BONDED ELECTROLUMINESCENT SYSTEM

This invention relates to an improved electroluminescent system in which the components are bonded to one another by an adhesive composition.

More specifically, this invention relates to an electroluminescent cell in which a thermoplastic adhesive is used to hold the dielectric and phosphor components in suspension.

Electroluminescent systems are used as light transmitting devices, usually in the form of films or panels and they are commonly referred to as electroluminescent lamps. They consist essentially of mutually opposed electrodes which are connected to a source of alternating current. A dielectric disposed between said electrodes serves as a matrix for the phosphors dispersed therein.

When current is applied said phosphors are activated and they emit a light whose intensity can be varied by controlling the input of electrical energy. In general, the greater the voltage the more intense the light which is emitted.

BACKGROUND

One difficulty with known systems is the loss of efficiency which results from exposure to moisture and impurities. Water vapor is sufficient to destroy the phosphors over a relatively short period of time.

Another difficulty is the sensitivity of electroluminescent systems to temperature fluctuations caused by electrical currents. The phosphor is particularly susceptible to degredation when subjected to heat over an extended period and this can lead ultimately to a complete failure of the device.

Still another problem is the inability of most dielectrics to transmit and maintain a high dielectric constant.

In U.S. Pat. No. 3,238,407 Mary Jaffe describes a system which attempts to overcome this problem by utilizing an insulating layer of barium titanate and cyanoethyl cellulose (CEC) in powdered form. This composition is interposed between a phosphor layer and a conductive layer and it has the effect of providing enhanced brightness. However, it has since been discovered that CEC in electroluminescent cells diminishes the adhesive capabilities of the system.

To overcome this undesirable effect plasticizers have been added to CEC-containing matrixes. Typical of these are, for example, phthalate esters, cresyl diphenyl phosphate and diethylene glycol. However, the addition of said plasticizers has not been entirely successful because although they produce the desired effect they also diminish the intensity of emitted light and have an adverse effect on lamp longevity.

Other disadvantages associated with CEC are its high cost and its tendency to interfere with the oxidation of available zinc in the phosphor component as a result of which the luminescent properties of the system are greatly diminished.

Moreover, the commercial availability of CEC is so unreliable and its purity so questionable that it cannot be depended upon to provide a dielectric matrix of predictably constant properties.

In U.S. Pat. No. 3,389,286 Takahashi et al describes an electroluminescent device in which the electrodes are separated by a dielectric which contains cyanoethylated polyvinyl alcohol (CEPVA). This device is superior to dielectrics containing plasticizers alone and it is said to provide good transparency, high insulative value and low electrical loss. However, the addition of CEPVA results in the partial dissolution of the phosphor component and a diminution of light intensity.

Moreover, CEPVA is sensitive to cold flow under pressure and this is undesirable in systems where spring-loaded electrical contacts are employed.

THE INVENTION

It is an object of this invention to provide an improved electroluminescent lamp in which the components are impervious to contamination by fluids and chemical impurities.

It is another object of this invention to provide an electroluminescent lamp in which the components are adhesively joined and said adhesive serves as a matrix for both the barium titanate and phosphor components.

It is a further object to provide a lamp in which the capacitance of said dielectric is enhanced by incorporating therein an effective amount of finely divided barium titante.

As a result of these improvements there is provided a lamp having superior electrical properties which exhibits resistance to contamination and wide fluctuations in temperature.

It is still another object to provide process means for the manufacture of electroluminescent lamps via an intermittent process or a continuous in-line method.

This invention describes a system in which both the phosphor and barium titanate components are so securely bound by the adhesive matrix that they lose their individual characteristics and function instead as a single entity in a unitary device.

Moreover, it is now possible as a result of this discovery to incorporate into said adhesive high concentrations of phosphor and barium titanate as a result of which the resulting cell exhibits a high dielectric capacitance.

The Drawings further illustrate this invention by depicting cells in which the herein-described compositions may be employed.

FIG. 1 describes an electroluminescent cell in which a layer of barium titanate in resin 1 is dispersed on a metal electrode 2. Superimposed on this combination is a transparent electrode 3 coated on its inner surface with successive layers of an electrically conductive metal oxide 4 and phosphor in resin 5.

Figure 2:
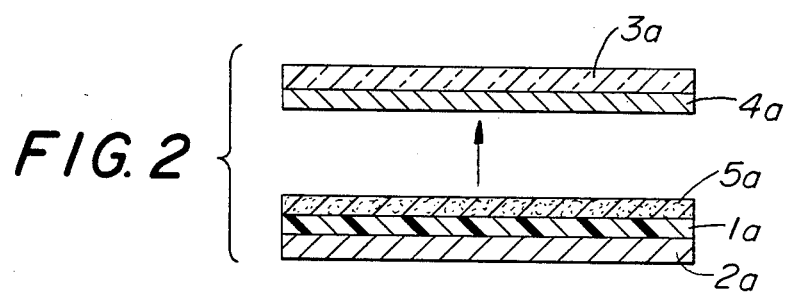

FIG. 2 describes an embodiment in which barium titanate in resin 1a is deposited onto a metal electrode 2a. A layer of phosphor in epoxy resin 5a is superimposed onto the barium titanate-resin layer and to this combination is added a transparent electrode 3a coated with a conductive metal film 4a.

Figure 3:
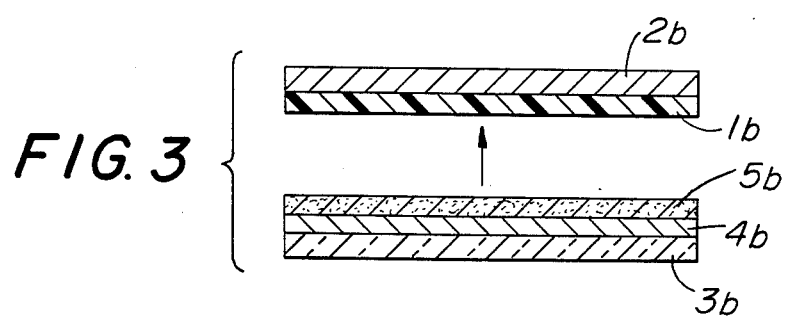

FIG. 3 describes a cell comprised of a transparent electrode 3b coated with successive layers of an electrically conductive metal oxide 4b and a phosphor-in-resin mixture 5b. Superimposed on this combination is a metal electrode 2b coated with a layer of barium titanate in resin 1b.

The incorporation of phosphor and barium titanate into the adhesive binder constitutes a point of novelty and requires strict adherence to the following procedural steps.

In practice, phosphor and barium titanate are made into separate slurries by individually mixing same with a glycol ether, an alkyl ketone or aromatic solvent. Suitable ethers include glycol alkyl ethers as, for example, lower alkylene glycol alkyl ethers such as propylene glycol methyl ether, dipropylene glycol methyl ether, tripropylene glycol methyl ether, ethylene glycol butyl ether, diethylene glycol methyl ether, diethylene glycol ethyl ether and diethylene glycol butyl ether. Said ethers are colorless liquids which combine the properties of alcohols, ethers and hydrocarbons. They are miscible with most organic liquids and their high solubility characteristics over a wide range of temperatures make them ideal solvents for the phosphor and barium components. Propylene glycol methyl ether (Dowanol) is particularly suitable for this purpose and it represents a solvent of choice in this stage of the process (Dowanol is a tradename of The Dow Chemical Company, Midland, Michigan).

The alkyl ketone and aromatic solvents which may be employed include, for example, lower alkyl ketones such as acetone, methyl ethyl ketone, ethyl ketone and methyl isobutyl ketone or toluene and xylene or the like.

The amount of barium titanate which is added to the glycol ether is not critical but it is desirable that the resulting slurry contain from about 70 to 75 weight percent of barium titanate based upon the total weight of the barium titanate-ether mixture, but, preferably, from about 80 to 90 weight percent. The addition is conducted with stirring to ensure that the resulting slurry is essentially homogeneous. Temperature is not critical at this stage and the addition and stirring steps may be conducted at ambient temperature. Vestiges of residual solvent are usually driven off by the evaporation which occurs during the stirring process.

The amount of phosphor added to the glycol ether is usually in the range of from about 70 to 95 percent based upon the total weight of the phosphor-ether mixture but, preferably, from about 75 to 85 weight percent. The addition is accompanied by stirring under conditions essentially identical to those described in the preceding paragraph.

The barium-containing slurry and phosphor-containing slurry, prepared as described above, are added to a thermoplastic adhesive which serves as an embedding material for the barium and phosphor-containing dielectrics. Said adhesive is derived from epoxy resins and its use as a matrix for barium titanate and phosphor constitutes a point of novelty in this invention.

The adhesive compositions herein described exhibit thermoplastic properties which are determined largely by the molecular weight and molecular-weight distribution of the bisphenol and epihalohydrin reactants from which they are derived. In general, said compositions have a molecular weight of from about 450-75,000.

The reaction of phenols with epihalohydrins is usually accompanied by secondary reactions but these can be avoided to a large extent by utilizing phenols which are monohydric primary alcohols. Secondary reactions can also be inhibited by employing large excesses of the bisphenol reactant, that is, concentrations of from about 1 part epoxide to 100 or more parts of bisphenol. Typical of the phenols which may be employed for this purpose are, for example, bisphenol A, dichlorobisphenol A, tetrachlorobisphenol A, tetrabromobisphenol A, bisphenol F and bisphenol ACP. The reaction between said phenols and epihalohydrin are conducted in a glycol ether, ketone or aromatic solvent of the type hereinbefore described.

Following the reaction of bisphenol and epihalohydrin a suitable resin is added to the resulting mixture with stirring and stirring is continued until a homogeneous adhesive composition is obtained. Suitable resins include urethane or the epoxy resins such as Dow epoxy resin which is available commercially as D.E.R. 684-EK40. The reaction proportions for this addition are in the range of from about 5-6 parts resin to about 1 part of the bisphenol A and epihalohydrin reaction product.

Following the addition of barium-containing slurry to the adhesive the mixture is stirred until a homogeneous dielectric composition is obtained. The phosphor-containing slurry and adhesive are then mixed in an essentially identical manner to afford the phosphor dielectric.

The dielectrics thus obtained are then deposited onto their respective electrodes by spray coating, roller coating, painting or hot pressing techniques which are known in the art. The thickness of the deposited layers may be varied to provide optimum light emitting effects but, in general, said compositions are applied in coating thicknesses of from about 20-60 microns.

Although I do not wish to be bound by any hypothesis it is believed that the adhesive composition of this invention envelops the phosphor particles and maintains them in a uniformly distributed arrangement on the cell electrode. As a consequence, the resulting lamp has superior electrical properties and it is eminently less susceptible to degradation from water vapor and impurities.

A preferred embodiment provides for applying the adhesive composition containing the phosphor in two or more coats of 35-45 microns per coat. The advantage of such thin layers lies in the more favorable total voltage which may be generated across the phosphor dielectric.

The electroluminescent lamps herein described possess at least one transparent electrode. Suitable substrates for this purpose include, for example, glass or plastics such as polyethylene, polypropylene, polyvinyl chloride, Mylar film (polyethylene terephthalate) and Zerlon film (polymeric methylmethacrylate in styrene).

The transparent electrode is prepared by coating a suitably transparent film with an electically conductive metal oxide, as for example, with gold or silver or an inorganic salt or oxide such as tin, cadmium of indium oxide, preferably, indium tin oxide. Methods by which said metals and metal oxides may be deposited onto the transparent film include, for example, vapor deposition, painting and hot pressing although other means which are known in this art may also be employed.

According to one known method indium tin in aqueous solution is applied to the surface of a glass or a plastic sheet and the coated substrate is dried in an oven to form a semiconductive layer of indium tin oxide. The metal oxide may be applied at a thickness of 1-3 microns. In like manner a conductive coating of silver, gold, copper, aluminum or other conductive metal or metal oxide may also be applied at similar thicknesses.

The non-transparent electrode may be any suitably conductive metal such as aluminum, gold, iron, copper, silver, metallized plastic or metallized paper and the like. Said electrode and the transparent electrode may be any desired thickness but the dimensions of the latter are usually determined with a view to permitting the maximum transmission of light. The conductive layer may range in thickness from a thin foil to a thick sheet.

The phosphor component includes compositions which are luminescent under the influence of an electric current as, for example, zinc sulfide, zinc oxide and zinc sulfide activated by manganese, copper or copper-lead and copper-manganese mixtures. The emitted light is dependent largely upon particle size and the concentration of phosphor in the thermoplastic adhesive. In general, the smaller the particle size, the greater the number of particles which may be present in the adhesive mixture and the greater the intensity of light emitted. In practice, it is most desirable to employ a ratio of from about 85 parts by weight of phosphor to about 15 parts by weight of the resin; however, these ratios are not critical and they may be varied without departing from the spirit or scope of this invention.

The components thus described are laminated to provide an integrated unitary cell. The lamination is accomplished by subjecting the assembled layers to a hot pressing operation at temperatures in the range of from about 150°–400° F. at a pressure of from about 5–100 psi for a period of about 0.1–2.0 seconds. Electrical connections are then attached to the individual electrodes and these are connected to a source of alternating current. The introduction of electrical current across the electrodes activates the phosphor particles and results in the emission of light.

This invention will now be illustrated by reference to embodiments but they are presented for illustration purposes only and this invention should not be construed as being limited thereto.

In the following examples all proportions are in parts by weight unless otherwise indicated.

EXAMPLE 1

Epoxy Bonded Electroluminescent Lamp

Step A; Epoxy Adhesive

An epoxy resin solution (D.E.R. 667*), obtained by treating 1600–2000 grams of bisphenol A with one gram of epichlorohydrin, was dissolved in propylene glycol methyl ether (Dowanol PM*). The resulting composition contained 40% solids.

A Dow epoxy resin solution (D.E.R. 684-EK40*) was added to said D.E.R. 667 in an amount sufficient to provide a ratio of 85 parts of the former to 15 parts of the latter and the mixture was stirred until a homogeneous adhesive was obtained.

*D.E.R. 667, Dowanol PM and D.E.R. 684-EK40 are registered trademarks of The Dow Chemical Company, Midland, Michigan.

Step B; Barium Dielectric

Barium titanate (85 parts) was added to propylene glycol methyl ether (Dowanol PM*) and the mixture was stirred. The resulting slurry was added with mixing to the adhesive of Step A (15 parts) and the dielectric thus obtained was deposited onto an aluminum foil and dried in an oven at 120° C. to a thickness of 40 microns.

Step C; Phosphor Dielectric

Zinc sulphide phosphor (87 parts) was mixed with Dowanol PM* and the resulting slurry was added to the adhesive (13 parts) of Step A. The resulting phosphor dielectric was deposited to a thickness of 25 microns onto a Mylar sheet coated with indium tin oxide and the sheet thus treated was dried at 120° C. for 20 seconds.

Step D; Epoxy Bonded Electroluminescent Lamp

The barium coated foil of Step B and the phosphor coated sheet of Step C were laminated under 150 psi pressure at 150° C. Electrical connections were made between the aluminum foil and electrically conductive Mylar sheet and the resulting apparatus was joined through a variable transformer to a source of 120 volt alternating current. The introduction of current resulted in an electroluminescence which compared favorably with the best high intensity electroluminescent lamp systems.

When urethane is substituted for D.E.R.-EK40 and the procedure of Example 1, Steps A–D are otherwise repeated there is thus obtained an electroluminescent lamp which exibits an intensity and life comparable to that of commercially available systems.

By following the procedure of Example 1, Step A, there are obtained a variety of adhesives suitable for the fabrication of electroluminescent lamps. The following equation and Table I illustrate the procedure of Step A and the adhesives obtained thereby:

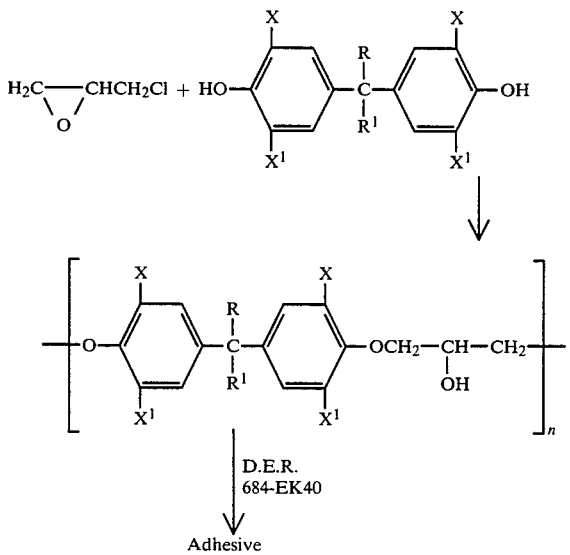

wherein R and R¹ and the same or different radicals selected from among hydrogen, lower alkyl such as methyl, ethyl, n-propyl, n-butyl or the like and mononuclear aryl such as phenyl and the like, and X and X¹ are the same or different and are selected from among hydrogen, lower alkyl such as methyl or ethyl and the like or halogen, such as chloro, bromo, fluoro or iodo and n is an integer having a value greater than 1.

TABLE I

| Ex | R | R¹ | X | X¹ |
|---|---|---|---|---|
| 2 | —CH₃ | —CH₃ | Cl | H |
| 3 | —CH₃ | —CH₃ | Cl | Cl |
| 4 | —CH₃ | —CH₃ | Br | Br |
| 5 | H | H | H | H |
| 6 | —CH₃ | —⟨phenyl⟩ | H | H |

By substituting the adhesives obtained according to Examples 2–6 for the adhesive of Example 1, Step A and otherwise following the procedure described in Steps A–D of said Example there are obtained epoxy bonded electroluminescent lamps having high emittance values and a resistance to degredation from moisture and chemical impurities.

This invention has been described by reference to specific embodiments which describe adhesively bonded systems; however, it will be appreciated by those skilled in the art that other adhesives may be substituted for those herein described without departing from the spirit or scope of this invention. Accordingly, any modifications which are within the skill of the artisan to effect should be considered as falling within the scope of the appended claims.

What is claimed is:

1. In an electroluminescent lamp comprised of mutually opposed electrodes, a dielectric and electroluminescent phosphor; the improvement which comprises utilizing as said dielectric a thermoplastic adhesive having a molecular weight of from about 450-75,000 and consisting essentially of a mixture of about 5-6 parts of an eqoxy resin and about 1 part of the reaction product of epihalohydrin and a bisphenol of the formula:

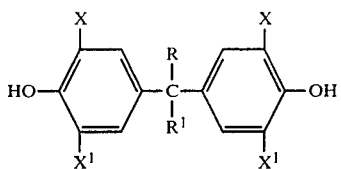

wherein R and $R^1$ are selected from the group consisting of hydrogen, lower alkyl and mononuclear aryl and X and $X^1$ are selected from the group consisting of hydrogen, halogen and lower alkyl.

2. The lamp according to claim 1 wherein said bisphenol is bisphenol A.

3. The lamp according to claim 1 wherein said resin is a urethane.

4. The lamp according to claim 1 wherein said dielectric includes barium titanate.

* * * * *